United States Patent
Fischer et al.

(10) Patent No.: US 9,377,785 B2
(45) Date of Patent: Jun. 28, 2016

(54) DEVICE FOR RELIABLE FILLING LEVEL CONTROL IN A QUENCHING CHAMBER THAT IS ARRANGED DOWNSTREAM OF ENTRAINED-FLOW GASIFICATION AND HAS INERT-GAS FLUSHING OF THE PRESSURE-RECORDING MEASURING LOCATION

(71) Applicants: Norbert Fischer, Lichtenberg (DE); Frank Hannemann, Freiberg (DE); Tino Just, Freiberg (DE); Friedemann Mehlhose, Freiberg (DE); Jörg Werner, Dresden (DE)

(72) Inventors: Norbert Fischer, Lichtenberg (DE); Frank Hannemann, Freiberg (DE); Tino Just, Freiberg (DE); Friedemann Mehlhose, Freiberg (DE); Jörg Werner, Dresden (DE)

(73) Assignee: Siemens Aktiengesellschaft, München (DE)

( * ) Notice: Subject to any disclaimer, the term of this patent is extended or adjusted under 35 U.S.C. 154(b) by 99 days.

(21) Appl. No.: 14/018,688

(22) Filed: Sep. 5, 2013

(65) Prior Publication Data

US 2014/0069525 A1 Mar. 13, 2014

(30) Foreign Application Priority Data

Sep. 7, 2012 (DE) .......................... 10 2012 215 898

(51) Int. Cl.

| | |
|---|---|
| *C10J 3/72* | (2006.01) |
| *B01J 7/00* | (2006.01) |
| *H01M 8/06* | (2006.01) |
| *C10J 3/20* | (2006.01) |
| *C10K 3/06* | (2006.01) |
| *C10J 3/16* | (2006.01) |
| *C10J 3/46* | (2006.01) |

(Continued)

(52) U.S. Cl.
CPC .. *G05D 9/00* (2013.01); *G05D 9/12* (2013.01); *Y10T 137/7287* (2015.04)

(58) Field of Classification Search
USPC ............... 48/61, 127.9, 127.1, 76, 69, 71–73, 48/200–202; 137/386, 392, 453
See application file for complete search history.

(56) References Cited

U.S. PATENT DOCUMENTS

| | | | | |
|---|---|---|---|---|
| 4,377,132 | A * | 3/1983 | Koog et al. ................... | 122/7 R |
| 4,487,611 | A * | 12/1984 | Ziegler ............................... | 48/69 |

(Continued)

FOREIGN PATENT DOCUMENTS

| | | |
|---|---|---|
| CN | 2867309 Y | 2/2007 |
| CN | 101168687 A | 4/2008 |

(Continued)

OTHER PUBLICATIONS

Schmalfeld J. et al: Die Veredlung und Umwandlung von Kohle, Technologien und Projekte 1970 bis 2000 in Deutschland, Deutsche Wissenschaftliche Gesellschaft für Erdöl, Erdgas und Kohle e.V., Kapitel 4.4.2 Gaskombinat Schwarze Pumpe-Verfahren (GSP), pp. 537-552, Dec. 2008.

*Primary Examiner* — Mary McManmon
*Assistant Examiner* — Hailey K Do

(57) ABSTRACT

A device for the reliable measurement and control of the filling level in the quencher sump of a quenching chamber arranged downstream of the gasifying chamber is provided. The device has a differential-pressure transmitter. The measuring location recording the pressure of the gas chamber is flushed with inert gas. The device unproblematically senses the pressures in the quenching chamber and at the bottom of the quencher sump. The difference between which is used as a controlled variable for the filling level.

6 Claims, 4 Drawing Sheets

(51) Int. Cl.
*F16K 21/18* (2006.01)
*G05D 9/12* (2006.01)
*G05D 9/02* (2006.01)
*H01M 2/36* (2006.01)
*G05D 9/00* (2006.01)

(56) References Cited

U.S. PATENT DOCUMENTS

| | | | |
|---|---|---|---|
| 4,852,997 A | | 8/1989 | Segerstrom et al. |
| 4,936,376 A | * | 6/1990 | Martin et al. .......... 165/71 |
| 5,233,943 A | * | 8/1993 | Martin et al. .......... 122/7 R |
| 2009/0202403 A1 | * | 8/2009 | Jimenez-Huyke et al. ... 422/198 |

FOREIGN PATENT DOCUMENTS

| | | |
|---|---|---|
| CN | 201254564 Y | 6/2009 |
| CN | 201666807 U | 12/2010 |
| CN | 102382685 A | 3/2012 |
| DE | 3447201 C1 | 4/1986 |
| DE | 102007043428 A1 | 3/2009 |
| JP | 2001241994 A | 9/2001 |
| JP | 2001271073 A | 10/2001 |
| WO | WO 2012019838 A1 | 2/2012 |
| WO | WO 2012095475 A2 * | 7/2012 |

* cited by examiner

DEVICE FOR RELIABLE FILLING LEVEL CONTROL IN A QUENCHING CHAMBER THAT IS ARRANGED DOWNSTREAM OF ENTRAINED-FLOW GASIFICATION AND HAS INERT-GAS FLUSHING OF THE PRESSURE-RECORDING MEASURING LOCATION

CROSS REFERENCE TO RELATED APPLICATIONS

This application claims priority to German application No. 10 2012 215 898.7 DE filed Sep. 7, 2012, the entire content of which is hereby incorporated herein by reference.

FIELD OF INVENTION

The invention relates to a device for reliable filling level control in a quencher that receives the hot raw gas and the liquid slag from an entrained-flow gasifying reactor and cools it by injecting an excess of water.

BACKGROUND OF INVENTION

The invention relates to a technology for entrained-flow gasification in which solid and liquid fuels are converted by a gasification medium containing free oxygen under pressures of up to 10 MPa and temperatures of up to 1850° C. into an H2- and CO-rich raw gas. The technology has been described in detail in "Die Veredelung und Umwandlung von Kohle" [The upgrading and conversion of coal], issued by the Deutsche Wissenschaftliche Gesellschaft für Erdöl, Erdgas und Kohle e.V. [German Society for Petroleum, Natural Gas and Coal Science and Technology], section 4.4.3, GSP-Vergasung [GSP gasification].

Accordingly, the raw gas 15, which leaves the reaction chamber at temperatures of up to 1850° C. together with airborne dust and the fuel ash melted into slag, is scrubbed in a quenching chamber by the injection of an excess of water and cooled to water vapor saturation, which at a gasification pressure of for example 4 MPa corresponds to a temperature of about 210° C. The slag collects in the water sump of the quenching chamber and is discharged together with slag water. Together with scrubbing waters and condensates occurring, the excess water from the quenching, as soot water, is subjected to a separation of the solids, to allow it to be recycled to the quenching and scrubbing process.

A dependable measurement of the filling level of the quencher sump 2 in the quenching chamber 1 that is formed by excess quenching water is of particular importance. As FIG. 1 shows, the quenching chamber 1 is arranged downstream of a gasifying chamber (not represented there) by way of a raw-gas and slag inlet 15. The filling-level measurement and control prevents excessive falling or rising of the intended water level. In the first case, raw gas gets into the excess water line 3, in the second case excess water runs into downstream parts of the plant by way of the raw-gas outlet 4. A possible breakthrough of raw gas into the excess water line 3 represents a safety problem, since the downstream soot water installation is not designed for synthesis gas.

To establish the filling level, the pressures in the upper part of the quenching chamber 1 and at the lower end of the quencher sump are measured, the differential pressure recorded by way of a differential-pressure transmitter 6 being a measure of the geodetic height of the water column, and consequently of the filling level 5, and generating the signals for the control for discharging excess water. For measuring the pressure in the quenching chamber 1, it is connected to one side of the differential-pressure transmitter 6. On the other side of the differential-pressure transmitter, there is, by way of a water-filled line 9, the pressure of the quenching chamber 1 together with the pressure resulting from the geodetic height of the quencher sump 2. The sensing of the pressures mentioned is susceptible to problems due to the formation of deposits and accompanying blockages of the measuring lines leading to the transmitter 6, both to the quencher sump 2 and also from the quenching chamber 1, with the result that the measured values are not produced or are falsified, which can lead to the aforementioned operational problems.

SUMMARY OF INVENTION

The object of the invention is improved reliability of the filling level control by measuring the pressures in the quenching chamber that are used as controlled variables, even when there is the risk of blockages due to deposits of the measuring locations.

The object is achieved by a device with the features of the independent claim.

The invention provides increased dependability and reliability of the measurement of the height of the filling level in the quenching chamber by flushing of the measuring location, whereby the risk of raw gas entering the overflow 3 or an overflow of the water bath into the raw-gas outlet 4 is reduced considerably.

Advantageous embodiments are specified in the dependent claims.

BRIEF DESCRIPTION OF THE DRAWINGS

The invention is explained below to the extent required for understanding, as an exemplary embodiment on the basis of figures in which.

DETAILED DESCRIPTION OF INVENTION

In the figures, the same designations designate the same elements.

Figure 1:
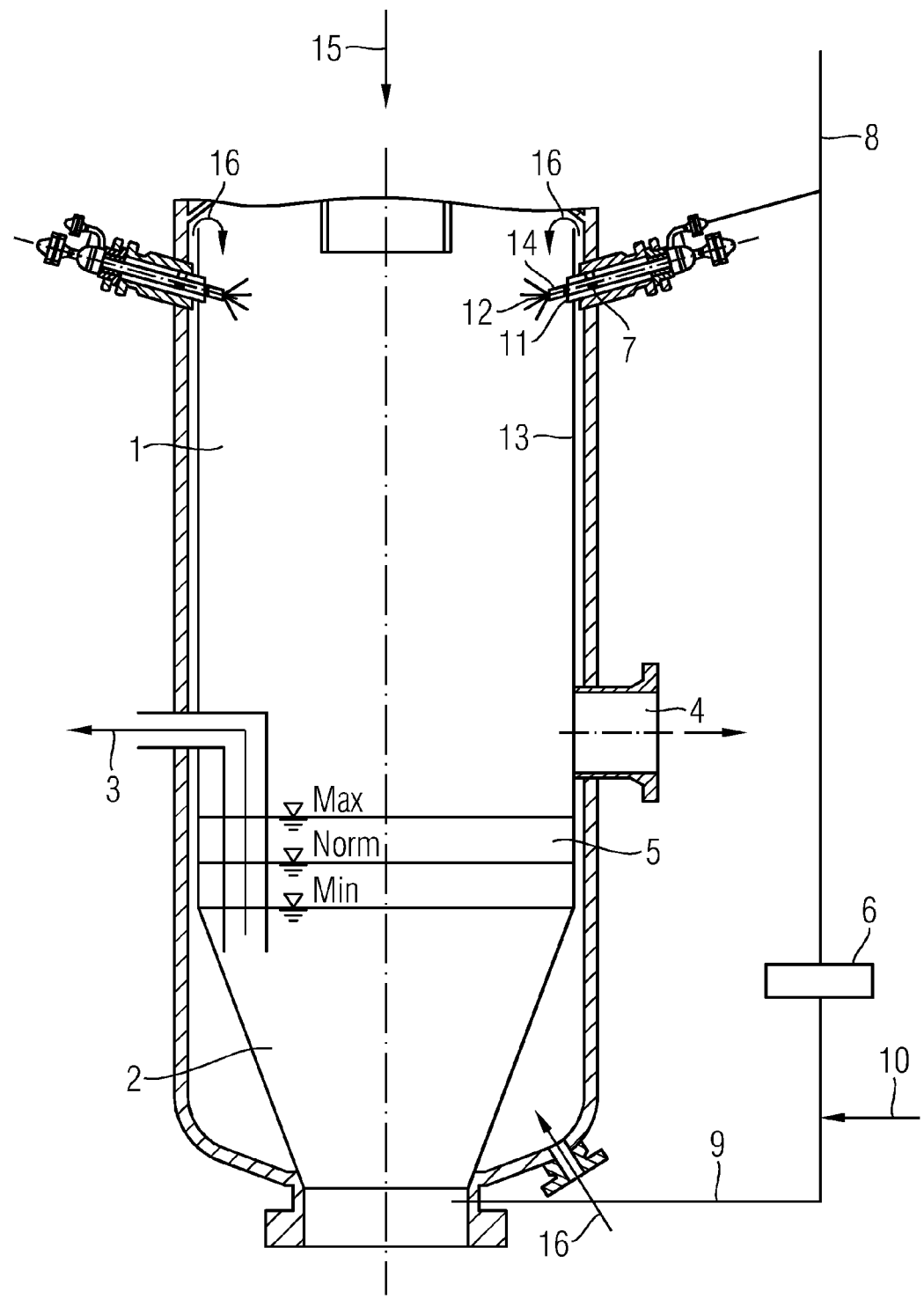
FIG. 1 shows a device according to the invention for the detection of the water level in the quenching arrangement of an entrained-flow gasifier.

The quenching arrangement represented in FIG. 1 for an entrained-flow gasifier is formed by an outer pressure-bearing shell, which receives an inner shell as a skirt 13. Between the outer shell and the inner shell there is a skirt flushing 16, the overflow of which takes place at the upper end of the inner shell into the interior of the skirt. In the lower part of the skirt there is a water bath 2, which is controlled between a minimum water level Min, the normal water level Norm and the maximum water level Max. Distributed in the upper region of the quencher are a number of quenching lances 7, which are distributed over the circumference and inject quenching water through the outer shell and the inner shell into the quenching chamber 1.

On the basis of the measurement of the differential pressure between a gas chamber of the quenching chamber 1 and the bottom of the water bath 2, as a measure of the geodetic height of the water bath, a differential-pressure transmitter 6 delivers an information signal, which is evaluated as a controlled variable for the discharge of the excess quenching water 3.

Blockages in the line which connects the gas chamber of the quenching chamber 1 to the differential-pressure transmitter 6 are avoided according to the invention by the feed into the quenching chamber being flushed with inert gas 8.

For measuring the pressure in the gas chamber of the quenching chamber 1, an inert-gas flushing is launched by way of a quenching lance 7, which is connected to one side of the differential-pressure transmitter 6.

Figure 2:
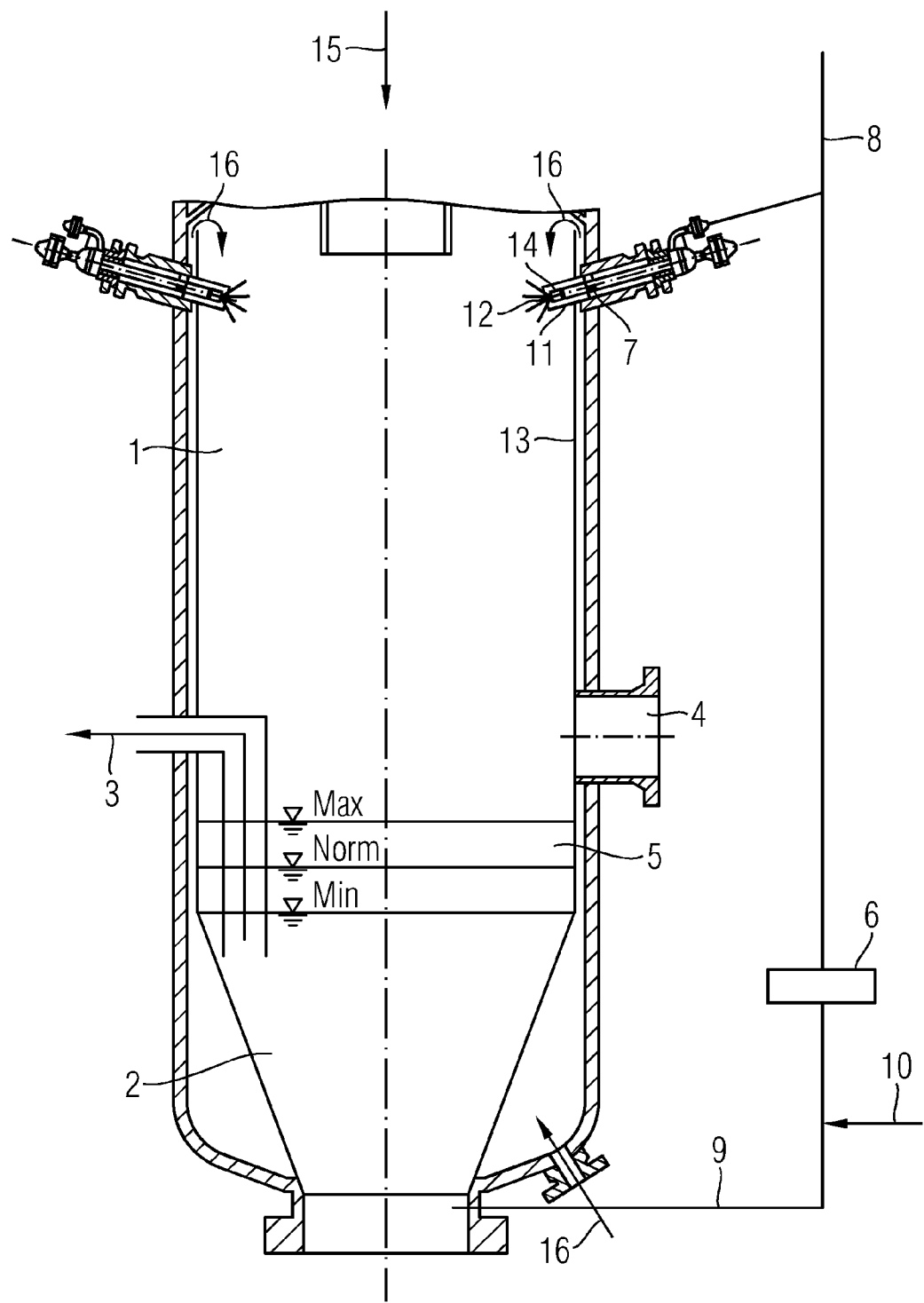
FIG. 2 shows a quenching arrangement corresponding to FIG. 1 with a special configuration of the quenching lances.

In a configuration as shown in FIG. 1 and FIG. 2, the line between the gas chamber of the quenching chamber 1 and the differential-pressure transmitter 6 is connected to the inert-gas feed 8 of a quenching lance 7. The quenching lance 7 is protected by a sleeve 11, which is flushed free both by the inert gas and by the quenching water.

As shown in FIG. 2, the protective sleeve 11 may be drawn forward into the quenching chamber 1 to such an extent that it protrudes beyond the nozzle head 12 of the spray nozzle 14 by 1 to 4 times the nozzle diameter. According to FIG. 1, it is possible to withdraw the spray nozzle 14 to behind a provided inner shell 13 and make the protective sleeve 11 finish with the inner shell 13.

Figure 3:
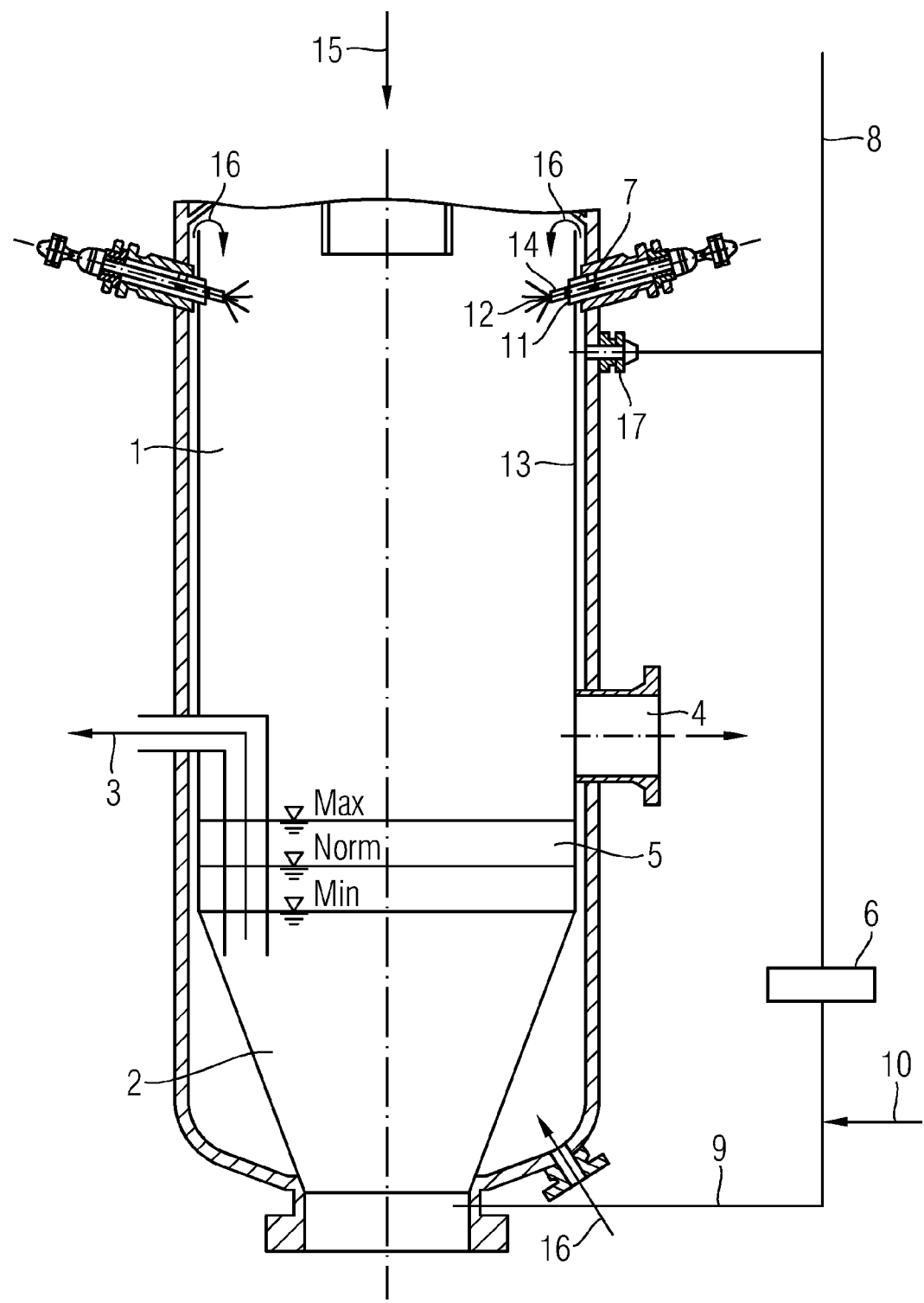
FIG. 3 shows a special configuration of the device according to the invention with determination of the pressure in the quenching chamber by detection of the pressure in the skirt flushing and FIG. 4 shows a special configuration of the device according to the invention with skirt flushing divided in two.

In a configuration as shown in FIG. 3, the inert-gas feed 8 may be connected directly to the inner shell 13.

Figure 4:
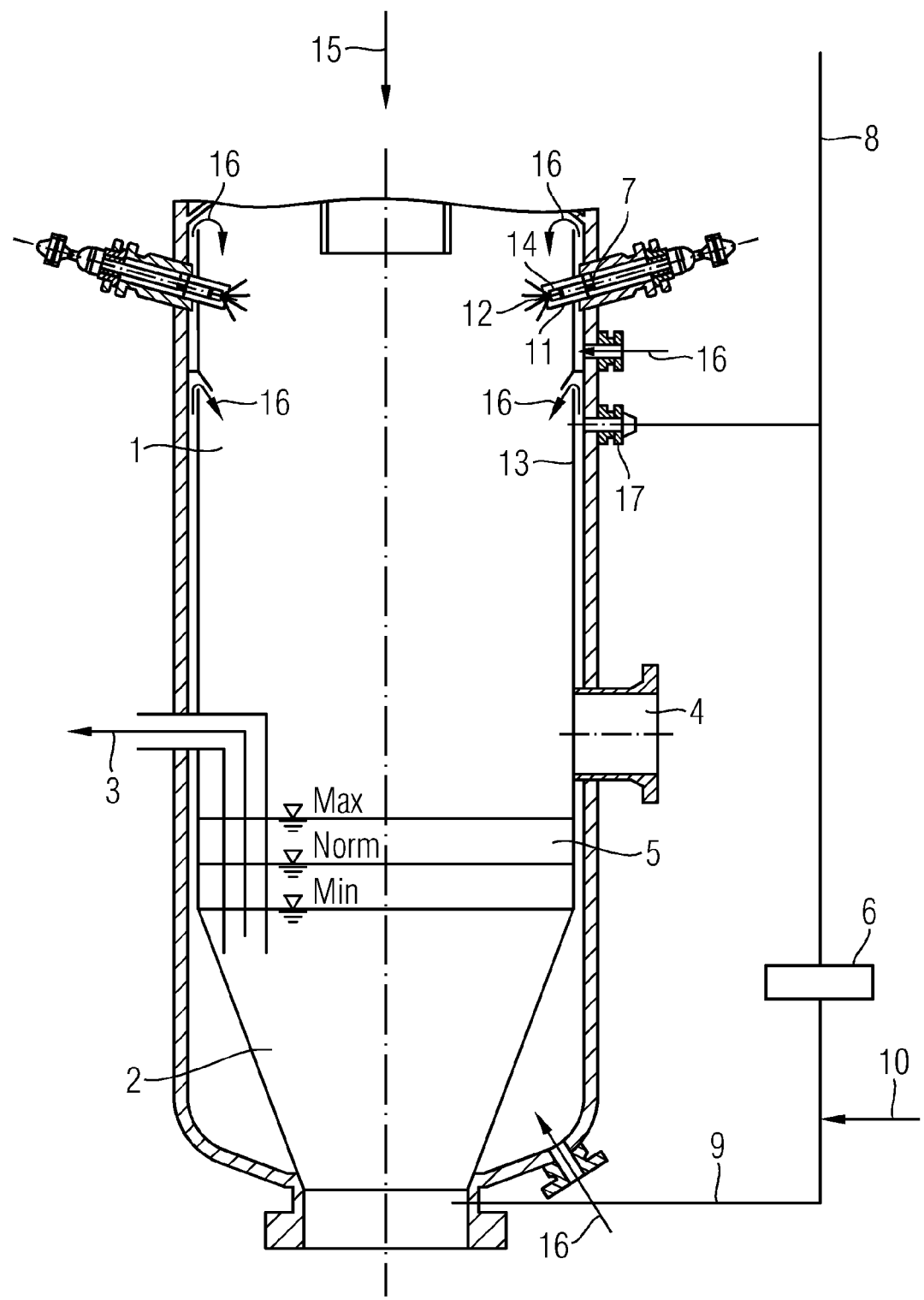

In a special variant as shown in FIG. 4, the skirt flushing is divided into an upper level and a lower level, the inert-gas-flushed connection to the differential-pressure transmitter being provided by a feed 17 into the skirt flushing of the lower level near the overflow (at the upper end of the skirt flushing). By arranging the overflow openings under the quenching lances, the overflow is kept free from contaminants.

At the measuring location which connects the quencher sump 2 to the differential-pressure transmitter 6 by way of the line 9, blockages are avoided by the line 9 being flushed with fresh water 10.

LIST OF DESIGNATIONS

1 Quenching chamber
2 Quencher sump, water bath
3 Excess water line
4 Raw-gas outlet
5 Filling level, water level of water bath
6 Differential-pressure transmitter
7 Quenching lance
8 Inert-gas flushing
9 Water-filled line to the bottom of the water bath
10 Flushing line for fresh water
11 Protective sleeve with inner flushing
12 Nozzle head
13 Inner shell, skirt
14 Spray nozzle
15 Raw-gas and slag inlet
16 Skirt flushing
17 Feed of inert gas into the skirt flushing

The invention claimed is:

1. A device for reliable filling level control in a quenching chamber, wherein the quenching chamber receives a hot raw gas and liquid slag from an entrained-flow gasifying reactor and cools the hot raw gas and liquid slag by injecting an excess of quenching water forming a water bath in a lower part of the quenching chamber, wherein a water level of the water bath can be controlled between a minimum level and a maximum level, wherein a raw-gas outlet is located above the water level of the water bath, the device comprising:

a differential-pressure transmitter comprising a first pressure-recording location for exposure to a pressure in a gas chamber of the quenching chamber and a second pressure-recording location for exposure to a pressure at a bottom of the water bath, wherein the differential-pressure transmitter provides an information signal as a measure of a geodetic height of the water bath; and a feed of inert gas line connecting the first pressure-recording location to the gas chamber that is adapted to provide an inert gas flushing, wherein the quenching chamber comprises an inner shell as a skirt and an outer pressure-bearing shell, wherein a skirt flushing is arranged between the inner shell and the outer pressure-bearing shell, wherein the skirt flushing overflows into an interior of the inner shell, wherein the feed of inert gas line connecting the first pressure-recording location to the gas chamber is connected to a quenching lance, wherein a sleeve enclosing the quenching lance is arranged and the inert-gas flushing is provided through the sleeve, and wherein the sleeve is drawn forward into the gas chamber to an extent that the sleeve protrudes beyond a nozzle head of a spray nozzle by 1 to 4 times a spray nozzle diameter.

2. The device as claimed in claim 1, wherein the feed of inert gas line connecting the first pressure-recording location to the gas chamber is connected into the skirt flushing.

3. The device as claimed in claim 2, wherein the skirt flushing comprises a first skirt flushing arranged at a lower level and a second skirt flushing arranged at an upper level, and wherein the feed of inert gas line connecting the first pressure-recording location to the gas chamber is connected into the first skirt flushing.

4. The device as claimed in claim 2, wherein the feed of inert gas line is connected in a vicinity of an overflow of the skirt flushing.

5. The device as claimed in claim 1, wherein the sleeve finishes flush with the skirt.

6. The device as claimed in claim 1, wherein a line connecting the second pressure-recording location to the bottom of the water bath can be flushed with fresh water.

\* \* \* \* \*